Figure 1:
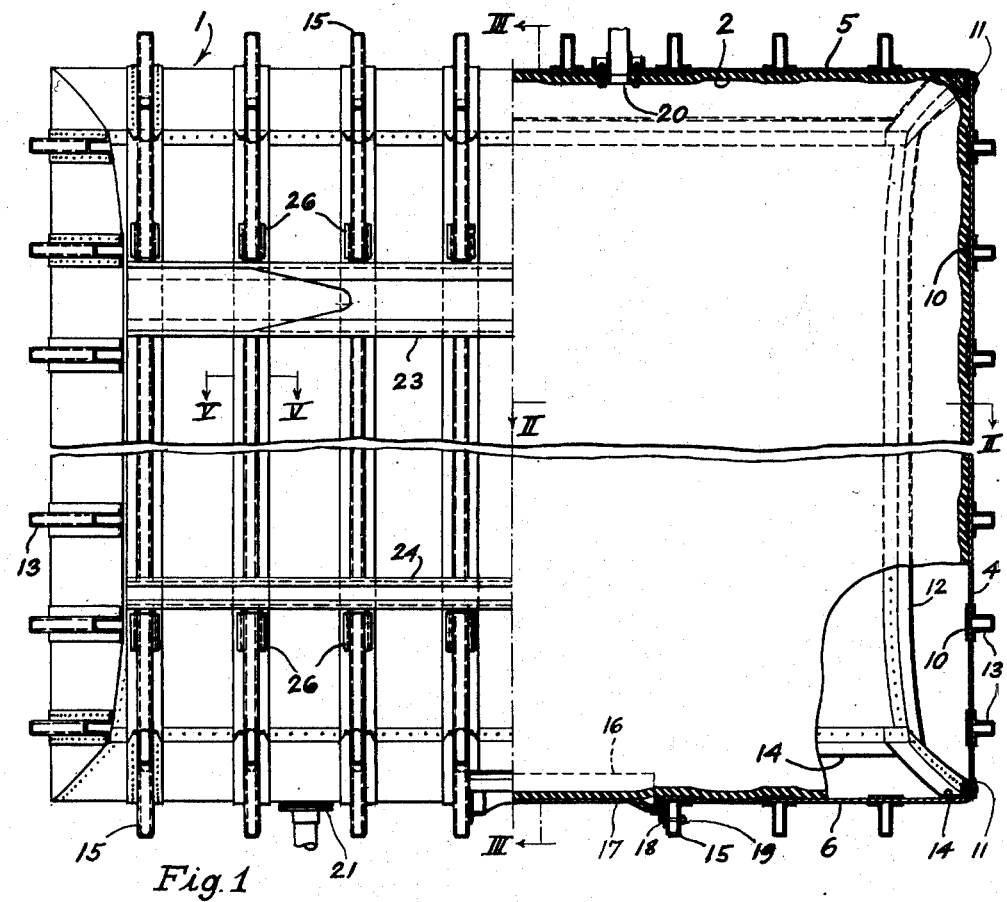

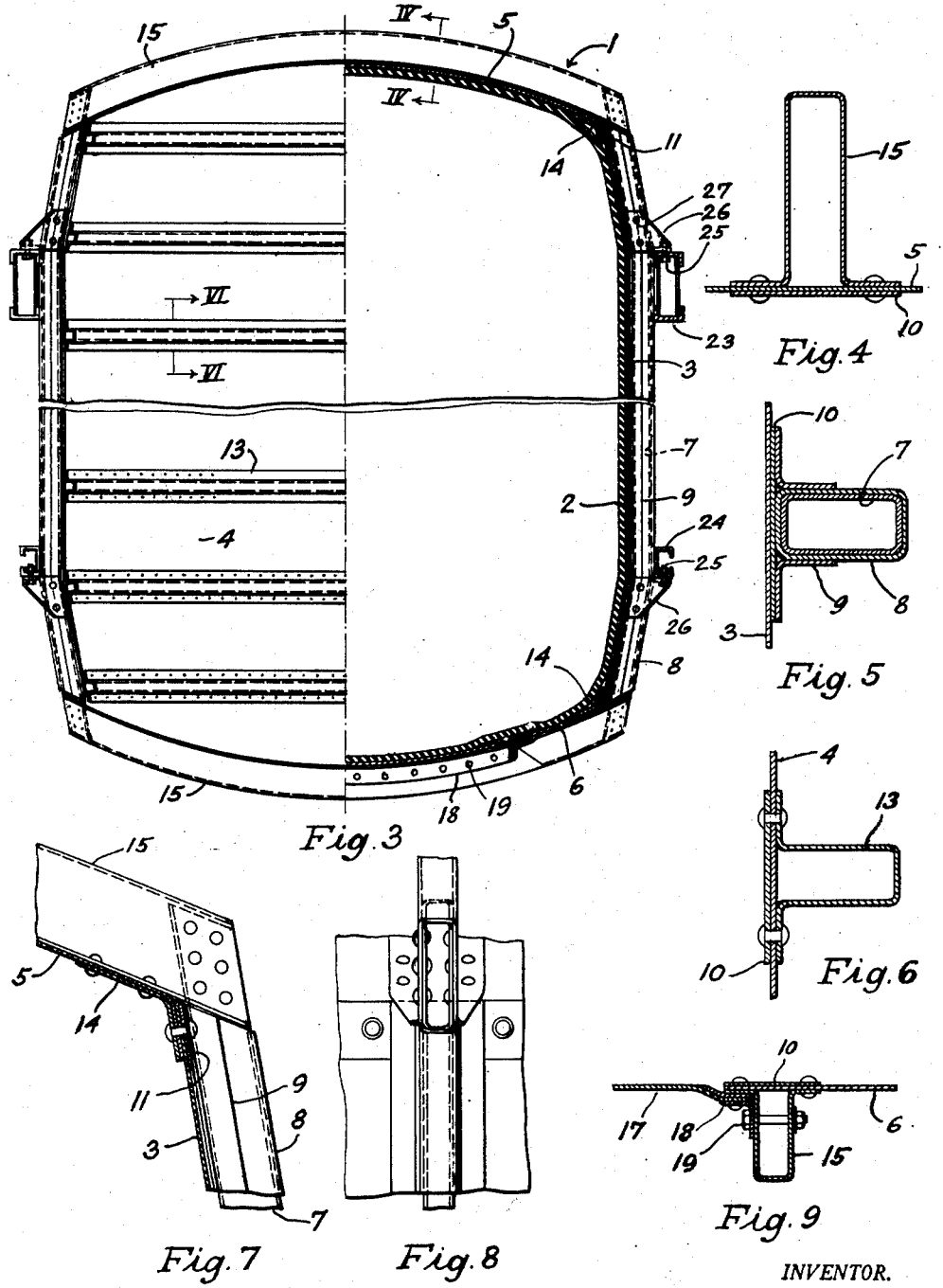

Patented May 12, 1953

2,638,138

UNITED STATES PATENT OFFICE 2,638,138

FUEL CELL SUPPORTING ENCLOSURE

Leonard J. Proebstle, Massillon, Ohio, assignor to Goodyear Aircraft Corporation, Akron, Ohio, a corporation of Delaware Application January 7, 1949, Serial No. 69,738

5 Claims. (Cl. 150—51)

This invention relates to flexible liquid containers for aircraft and in particular to supporting enclosures therefor.

Heretofore, it has been the practice in military aircraft to enclose and support against deformation flexible fuel cells of the self-sealing type, or for commercial aircraft of the lighter non-self-sealing type, by stiffened sheet metal walls. In some cases, flexible fuel cells were shaped to certain contour portions of a wing, fuselage, or float of an airplane and partially supported by the outer metal cover thereof, whereas, in other cases, the inner airplane structure required a specific design to properly accommodate the fuel cell and its supporting walls.

However, it has been experienced in combat action that sheet metal as a fuel cell enclosure or support was not entirely satisfactory, because when pierced by a projectile the hole made was usually surrounded by flaring jagged edges penetrating into the cell puncture and thus prevented its closing. A similar or even worse condition was created by the projectile at its exit from the fuel cell. In this case a portion of the metal wall around the hole dishes outwardly, whereby the puncture in the fuel cell, which otherwise would seal itself, is stretched open by the fluid pressure. It has been found that replacing the metal casing by other materials, like plywood, vulcanized fibre, and others, was not satisfactory, because of splintering or brittleness.

To overcome these conditions an additional protective rigid wall was provided between a fuel cell and its supporting enclosure to prevent too much distortion of the metal around a bullet hole. However, such walls have the disadvantage of making the construction heavier, more complicated and expensive which is particularly objectionable for large fuel cells having capacities of more than about 400 and up to several thousand gallons.

Other solutions are known in eliminating the metal support casing entirely and by replacing it with a casing made up of laminations of rubber or rubberlike material which after curing assumes desired stiffness. Such casings when made with flat walls have sufficient stiffness if used for relatively small fuel cells, but are heavy, and, if used for large cells, require very thick walls the weight of which would be prohibitive.

It is the general object of the invention to avoid and to overcome the foregoing and other difficulties of and objections to prior art practices by the provision of a separate close-fitting, relatively thin, non-metallic fuel cell supporting enclosure comprising a shell consisting of a plurality of layers of resin-impregnated fibrous material of semi-rigid structure reinforced by spaced stiffeners to retain its shape at all load conditions, except for slight bulging between the stiffeners.

Another object of the invention is to entirely aviod metal walls in the fuel cell supporting casing in contact with the flexible fuel cell to prevent, in case of a penetrating projectile, the forming of sharp and flaring edges around a puncture in the supporting casing and to keep the hole as small as possible.

Another object of the invention is to make the non-metallic supporting enclosure, together with the removable flexible fuel cell, a self-contained unit to be assembled as such outside of an aircraft and which in its shape is substantially independent of the aircraft structure.

Another object of the invention is to provide a non-metallic shell for a fuel cell support casing of light weight.

The aforesaid objects of the invention, and other objects which will become apparent as the description proceeds, are achieved by providing for a flexible self-sealing fuel cell a rigid supporting casing as a separate structure having walls made of a plurality of layers of fibrous material which is impregnated with any suitable, thermo-setting resin resistant to liquid hydrocarbons, and which will cure at low pressure and elevated temperature to obtain rigidity. Although glass fibre cloth, rayon, cotton, silk, etc., impregnated with thermo-setting resins, are suitable for making the casing walls, shooting tests with .50 caliber projectiles have demonstrated that nylon cloth, because of its greater resiliency, shows smallest holes and without burrs and is also more resistant to cracking. These casing walls, which are rather thin and of light weight, are reinforced by stiffening members secured thereto to retain the shape of the casing under load and at all flight conditions. In order to insert the fuel cell into the supporting casing, the casing is provided with a man hole which gives easy access for assembling it and for making necessary repairs. Longitudinal members attached to vertical stiffeners of the side walls of the casing distribute the stresses set up by various load conditions in flight substantially uniformly over the casing walls and are adapted to be connected to suitable points of the aircraft structure, either permanently or releasably in case the fuel cell is of the droppable type.

Figure 2:
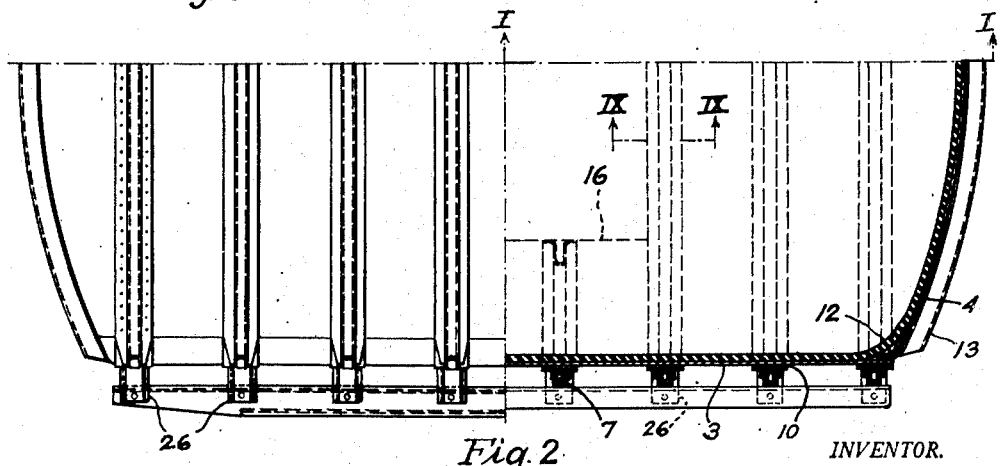

For a better understanding of the invention reference should be had to the accompanying drawings, wherein Fig. 1 is a side view of the fuel cell containing supporting casing, according to the invention, with the right half showing a cross-sectional view taken on line I—I of Fig. 2, Fig. 2 is a half top view of Fig. 1 with one half showing a cross-sectional view taken on line II—II of Fig. 1, Fig. 3 is an end view of Fig. 1 with one half showing a cross-sectional view taken on line III—III of Fig. 1, Fig. 4 is a transverse cross-sectional view in larger scale, taken on line IV—IV of Fig. 3 of a top stiffening member, Fig. 5 is a transverse cross-sectional view in larger scale, taken on line V—V of Fig. 1, of a side wall stiffener, Fig. 6 is a transverse cross-sectional view in larger scale, taken on line VI—VI of Fig. 3, of an end wall stiffener, Fig. 7 is an enlarged cross-sectional view of a corner connection of a side wall with the top or bottom wall, Fig. 8 is a side view of Fig. 7, and Fig. 9 is a cross-sectional view taken on line IX—IX of Fig. 2.

With specific reference to the form of the invention illustrated in the drawings, the numeral 1 indicates in general a supporting enclosure or casing for a flexible bullet-proof fuel cell 2 of the self-sealing type. The side walls 3, the end walls 4 and the top and bottom walls 5 and 6, respectively, of the casing, each having a total thickness of between about .04″ to .12″ depending on the performance factor of an airplane, consist of a plurality of layers of suitable fibrous material, preferably nylon cloth, which is impregnated with thermo-setting resin curing at low pressure and elevated temperature into a semi-rigid structure, and which is resistant to hydrocarbon liquids. Each one of the walls, formed in a separate piece over a mold, is reinforced by rigid stiffening members attached thereto, either by bonding, riveting, bolting, or by any other suitable fastening means.

The side walls 3, which are shown bent inwardly at top and bottom along longitudinal lines, are reinforced by rectangular tubes 7 made of light metal alloys, preferably Duralumin. Each of these tubes, which are suitably spaced from each other and running from top to bottom, is provided in substantially full length, except near its ends, with a cover 8, made of layers of resin-impregnated nylon cloth, along which are attached at both sides angles 9 and at its base a strip 10, all made of the same material as cover 8. Strips 11, Fig. 7, made of glass fibre cloth, are provided where necessary around the wall edges for reinforcing the riveting joints. This entire wall assembly is then subjected to a well known curing process to form it into permanent shape.

The arched end walls 4 which are flanged along their vertical edges to be connected with the side walls 3 are provided along the inside of these edges with resin-impregnated glass fibre cloth reinforcing strips 12 and the outside of their top and bottom edges, to be connected with the top wall 5 and bottom wall 6, with strips 11 of the same material. Additional strips 10 are secured to the inside of the walls 4 opposite stiffening members 13 to be attached to the walls later on. All of these reinforcing strips are bonded to the walls 4 in the usual way by curing the wall assembly into semi-rigid form. After curing, the stiffening members 13, fitting over the arched contour of the wall and having a cross-sectional shape of a flanged U, are riveted with their flanges to the wall with the manufactured rivet head on the inside resting against the reinforcing strip 10 and with the driven head on the flanges of the stiffener 13.

Similarly constructed are the arched top and bottom walls 5 and 6, respectively, which are flanged all around and provided with reinforcing angles 14 made of resin-impregnated glass fibre cloth. The arched flanged U-shaped stiffeners 15, however, are of somewhat greater height than the end wall stiffeners 13 to resist their greater load. For giving access to the inside of the enclosure for assembling it and for inserting the fuel cell 2 the bottom wall 6 has cut out a man hole 16 closed by a cover 17, which is made of the same material as the walls, and held in a metal stiffening frame 18 secured by bolts 19 to adjacent stiffening members 15. In addition, the top and bottom walls are provided with the necessary openings for fuel inlet 20 and fuel outlet 21.

The walls thus prepared are then assembled into a complete fuel cell supporting enclosure by securing together, preferably by rivets, corresponding wall edges. To obtain a structure of greatest rigidity the stiffeners 7 of the side walls and the stiffeners 15 of the top and bottom walls which are disposed in the same plane are riveted together at their interlocking ends. However, to further strengthen and stiffen the supporting casing, pairs of longitudinal beams 23 and 24 attached by bolts 25 to brackets 26 fastened by bolts 27 to the upright side wall stiffeners 7 tie these stiffeners together to prevent longitudinal deformation and buckling of the rather thin casing walls. The upper beams 23 are adapted to transmit the fuel load by suitable bracings (not shown) into the aircraft structure, and the lower beams 24 are intended to be connected with the aircraft structure by bracings to prevent side and longitudinal movements of the supporting casing under any load, as well as, at all flight conditions of an aircraft.

Although the principles of the invention as shown in the drawings and described are particularly adapted for heavy bullet-proof aircraft fuel cells, or cells containing other liquids, the invention shall not be restricted thereto but is equally applicable to light non-bullet-proof fuel or other liquid carrying cells, as used in commercial aircraft, because of its practical and structural advantages, including saving of weight, over constructions of prior art. However, when the invention is used for commercial purposes the shell made of resin-impregnated fibrous material can be replaced by a thin metal shell of appropriate strength, which somewhat simplifies the construction and its manufacture.

It will be recognized from the foregoing description that the objects of the invention, when used for bullet-proof fuel cells, have been achieved by eliminating metal supporting walls, as well as, heavy, stiff protecting walls between the fuel cell and its supporting enclosure by providing instead a single non-metallic wall of minimum thickness made of laminations of thermo-setting resin-impregnated fibrous material, which has great strength, a certain stiffness with sufficient flexibility to prevent enlarged bullet holes, and which does not burr and crack. The rigid stiffeners and their arrangement on the walls give casings of any capacity the required strength without undue deformation at relatively low weight and the shape of the casing, provided sufficient space is available, is independent of a specific aircraft construction. Besides, casings of this type in any size and shape can be built separately, irrespectively of the construction of the fuel cell, and saving in weight increases the efficiency of an aircraft and lowers the cost of its operation.

The advantage of a separate form-fitting fuel cell enclosure is also evident for commercial purposes in which case a light bladder type cell can be used with the shell being made of metal, preferably Duralumin, where there is no danger of an enemy attack.

While certain representative embodiments and details have been shown for the purpose of illustrating the invention, it will be apparent to those skilled in the art that various changes and modifications may be made therein without departing from the spirit or scope of the invention.

What I claim:

1. A supporting enclosure for flexible, large-capacity aircraft fuel cells, said enclosure comprising a shell composed of semi-rigid walls made of layers of resin-impregnated fibrous material, and substantially equally spaced light alloy metal ribs firmly attached to and running fully across the outside of each of said walls for stiffening the walls, but allowing visibly observable deformation of the walls between the ribs when acted upon by the fuel load.

2. A supporting enclosure for flexible aircraft fuel cells having a capacity of from 400 to several 1000 gallons, said enclosure comprising a shell composed of walls made of layers of nylon cloth having a total thickness of from about .04 to about .12 inch, depending on the size of the cell, and rigid metal ribs firmly attached to and running fully across the outside of each of said walls for stiffening the walls but allowing visibly observable deformation of the walls between the ribs when acted upon by the fuel load.

3. A supporting enclosure adapted to receive a flexible aircraft fuel cell of substantially rectangular cross-section having a capacity of over about 400 gallons, said supporting enclosure being composed of semi-rigid side, top, bottom, and end walls, all made of layers of thermo-setting resin-impregnated nylon cloth of a total thickness of about .04 to about .12 inch, depending on the size of the cell and on flight conditions, and rigid substantially equally spaced reinforcing metal ribs firmly attached to and running fully across the outside of said walls, the ribs of the side walls and corresponding ribs of the top and bottom walls being disposed, respectively, in vertical planes, the ribs of the side, top and bottom walls extending beyond their edges and being rigidly connected with each other at their ends to form closed frames, whereas the ribs of the end walls ending at the wall edges are disposed horizontally.

4. A supporting enclosure adapted to receive a flexible aircraft fuel cell of substantially rectangular cross-section having a capacity of over about 400 gallons, said supporting enclosure being composed of semi-rigid side, top, bottom, and end walls, all made of layers of thermo-setting resin-impregnated nylon cloth of a total thickness of about .04 to about .12 inch, depending on the size of the cell and on flight conditions, rigid substantially equally spaced reinforcing metal ribs firmly attached to and running fully across the outside of said walls, the ribs of the side walls and corresponding ribs of the top and bottom walls being disposed, respectively, in vertical planes, the ribs of the side, top and bottom walls extending beyond their edges and being rigidly connected with each other at their ends to form closed frames, whereas the ribs of the end walls ending at the wall edges are disposed horizontally, attachment means firmly attached to the ribs of the side walls near their upper and lower portions, and longitudinal side beams connecting said means and being adapted for uniformly supporting and distributing the cell load acting upon said frames in vertical, as well as in lateral and longitudinal direction when said enclosure is mounted by means of said beams in an aircraft structure.

5. For a flexible airplane fuel cell of any suitable cross-section, a supporting enclosure, said enclosure being composed of a closed shell having semi-rigid walls, closed vertical rigid metal frames substantially equally spaced from each other and conforming to said cross-section in all around contact with the outer surface of said shell and being firmly fastened thereto, metal ribs in horizontal substantially equally spaced planes for stiffening the remaining wall portions in their full width, but permitting slight bulging of the shell between the metal frames and between the ribs, and longitudinal side beams connecting the vertical portions of said frames and being adapted for uniformly supporting and distributing the cell loads acting upon said frames in vertical, as well as in lateral and longitudinal direction when said enclosure is mounted by means of said beams in an aircraft.

LEONARD J. PROEBSTLE.

References Cited in the file of this patent

UNITED STATES PATENTS

| Number | Name | Date |
| --- | --- | --- |
| 494,275 | Kirby | Mar. 28, 1893 |
| 563,070 | Schmitz | June 30, 1896 |
| 2,038,420 | Coakley | Apr. 21, 1936 |
| 2,360,525 | Sperry | Oct. 17, 1944 |
| 2,381,402 | Weber et al. | Aug. 7, 1945 |
| 2,406,679 | Gray et al. | Aug. 27, 1946 |
| 2,421,613 | Gray et al. | June 3, 1947 |
| 2,429,688 | Hoover | Oct. 28, 1947 |
| 2,439,562 | Cunningham | Apr. 13, 1948 |
| 2,440,965 | Merrill et al. | May 4, 1948 |
| 2,446,811 | Crawford | Aug. 10, 1948 |
| 2,446,815 | Davies et al. | Aug. 10, 1948 |
| 2,505,348 | Cunningham | Apr. 25, 1950 |

FOREIGN PATENTS

| Number | Country | Date |
| --- | --- | --- |
| 394,415 | Great Britain | June 29, 1933 |